United States Patent [19]

Burr et al.

[11] Patent Number: 4,982,337

[45] Date of Patent: Jan. 1, 1991

[54] SYSTEM FOR DISTRIBUTING LOTTERY TICKETS

[76] Inventors: Robert L. Burr, 7515 Charmant Dr. Ste. 1407, San Diego, Calif.; Laird A. Campbell, Rte. 2, Box 223, Laceys Springs, Ala.; Donald H. Keagle, 2018 Hensel Ave.; Alfred L. Fulton, 9423 O'Jay Dr., both of Huntsville, Ala. 35803

[21] Appl. No.: 128,070

[22] Filed: Dec. 3, 1987

[51] Int. Cl.[5] ........................ G06F 15/28; A63B 71/00

[52] U.S. Cl. ........................................ 364/479; 83/209; 83/242; 221/7; 225/100; 273/139; 364/412

[58] Field of Search ............... 364/479, 412, 200, 900; 902/23, 1, 13, 22, 31; 273/138 R, 132 A, 139, 269; 83/205, 209, 165, 76, 242, 243, 42; 235/379, 381; 377/5, 15; 226/44; 221/1, 4, 7, 8, 9, 26, 32; 225/4, 5, 27, 32, 93, 100, 101, 10.16

[56] References Cited

U.S. PATENT DOCUMENTS

| | | | |
|---|---|---|---|
| 3,621,964 | 11/1971 | Riddle et al. | 221/7 X |
| 3,894,669 | 7/1975 | Wescoat | 225/103 |
| 3,931,761 | 1/1976 | Carrus | 364/900 |
| 4,094,451 | 6/1978 | Wescoat | 225/96 |
| 4,140,259 | 2/1979 | Kostka | 225/16 |
| 4,157,670 | 6/1979 | Herring | 83/165 |
| 4,192,618 | 3/1980 | Konour, Jr. et al. | 226/44 X |
| 4,261,497 | 4/1981 | Roetter et al. | 225/100 |
| 4,275,456 | 6/1981 | Tanaka et al. | 364/900 |
| 4,322,612 | 3/1982 | Lange | 364/412 X |
| 4,373,726 | 2/1983 | Churchill et al. | 273/139 X |
| 4,375,189 | 3/1983 | Berner et al. | 225/100 X |
| 4,494,197 | 1/1985 | Troy et al. | 364/900 X |
| 4,652,998 | 3/1987 | Koza et al. | 364/900 X |
| 4,704,518 | 11/1987 | Brunn et al. | 364/412 X |
| 4,716,799 | 1/1988 | Hartmann | 364/479 X |
| 4,832,341 | 5/1989 | Muller et al. | 273/138 A X |

*Primary Examiner*—Joseph Ruggiero
*Attorney, Agent, or Firm*—Gregor N. Neff

[57] ABSTRACT

A system and method for distributing lottery tickets includes a large number of remote, ticket-dispensing units which are connected intermittently, e.g., once each day or week to a central computer. The units record the numbers of tickets sold and transmit the sales data to the central computer, which in turn performs all the necessary accounting functions. Sales reports and invoice data may be sent by the central computer to each unit for printing, which avoids the need to mail the reports/invoices. The tickets are stored in fan-fold form and are burst, rather than cut, apart for dispensing. The tickets are dispensed at one end of the unit which faces the customer. A control panel for the vendor is located at the opposite end. Tickets of different length may be dispensed with an imprint of the vendor's name.

35 Claims, 8 Drawing Sheets

FIG. 2A

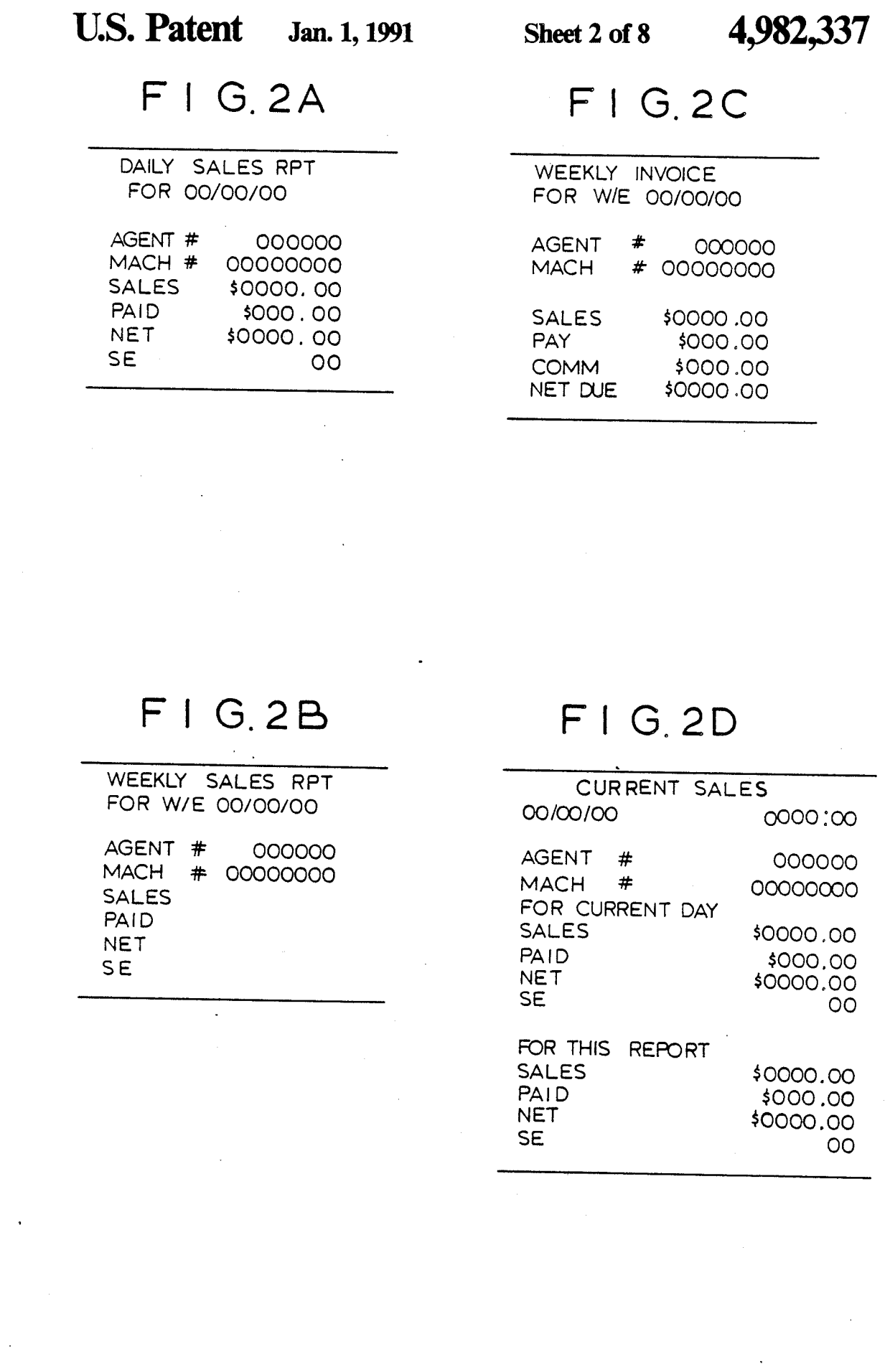

DAILY SALES RPT
FOR 00/00/00

| | |
|---|---|
| AGENT # | 000000 |
| MACH # | 00000000 |
| SALES | $0000.00 |
| PAID | $000.00 |
| NET | $0000.00 |
| SE | 00 |

FIG. 2C

WEEKLY INVOICE
FOR W/E 00/00/00

| | |
|---|---|
| AGENT # | 000000 |
| MACH # | 00000000 |
| SALES | $0000.00 |
| PAY | $000.00 |
| COMM | $000.00 |
| NET DUE | $0000.00 |

FIG. 2B

WEEKLY SALES RPT
FOR W/E 00/00/00

| | |
|---|---|
| AGENT # | 000000 |
| MACH # | 00000000 |
| SALES | |
| PAID | |
| NET | |
| SE | |

FIG. 2D

CURRENT SALES

| | |
|---|---|
| 00/00/00 | 0000:00 |
| AGENT # | 000000 |
| MACH # | 00000000 |
| FOR CURRENT DAY | |
| SALES | $0000.00 |
| PAID | $000.00 |
| NET | $0000.00 |
| SE | 00 |
| FOR THIS REPORT | |
| SALES | $0000.00 |
| PAID | $000.00 |
| NET | $0000.00 |
| SE | 00 |

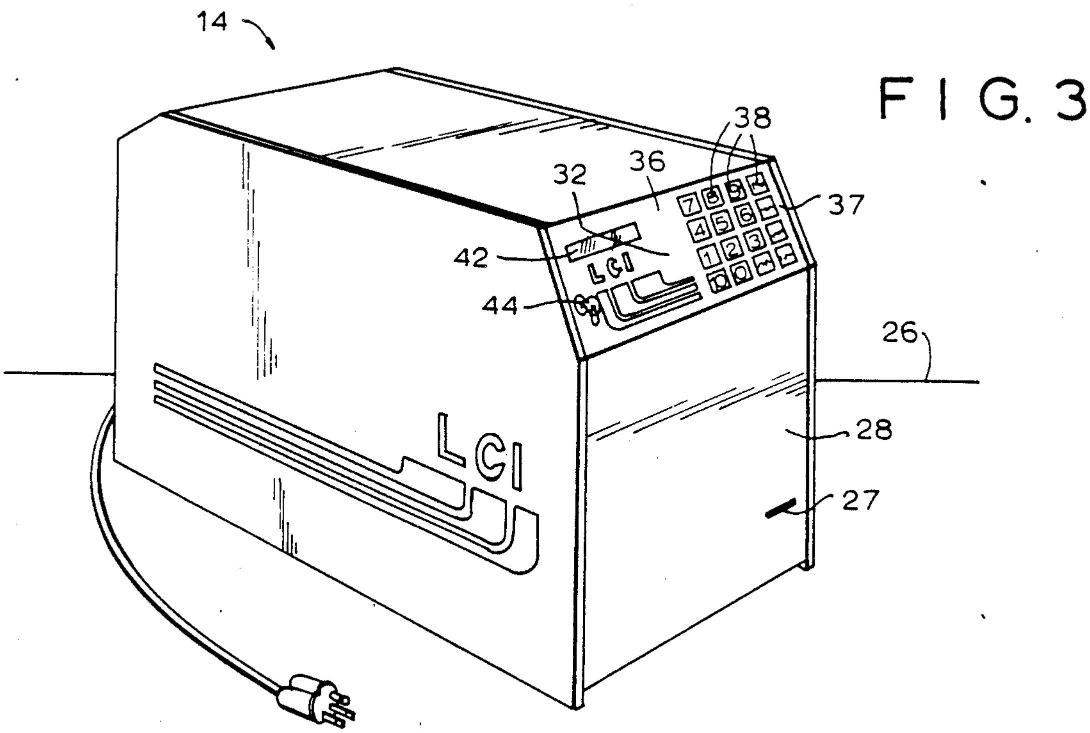
FIG. 3
FIG. 4
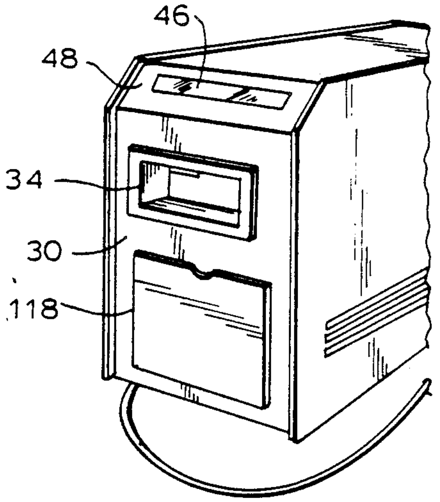
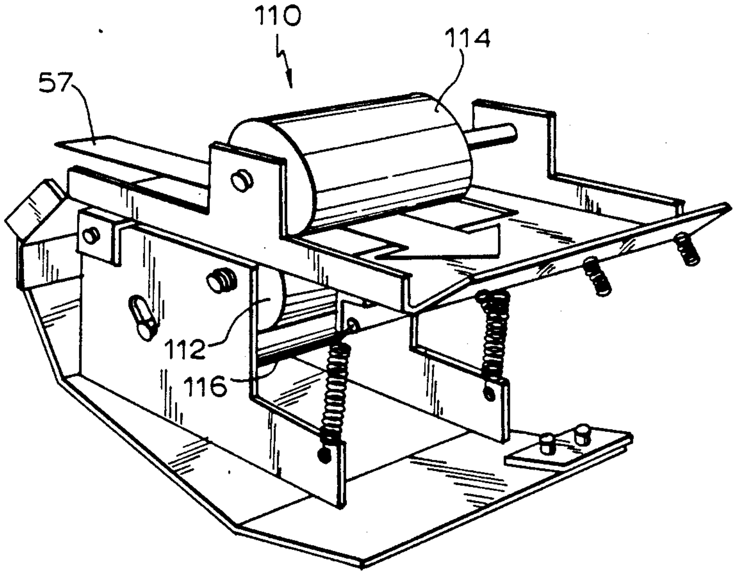
FIG. 9

FIG. 5
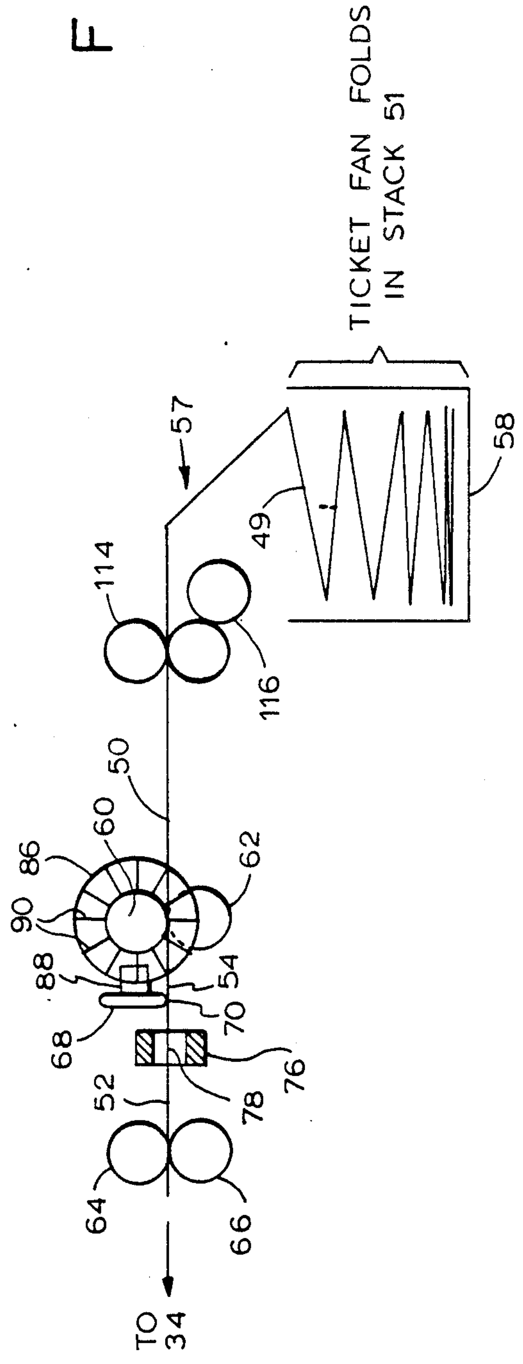
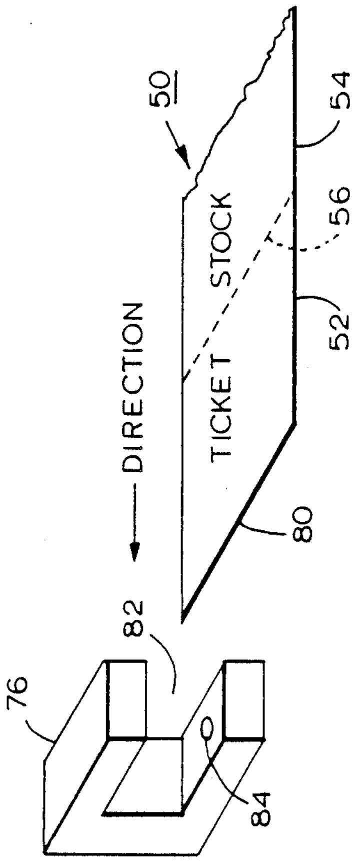
FIG. 6

SYSTEM FOR DISTRIBUTING LOTTERY TICKETS

FIELD OF THE INVENTION

The present invention relates generally to ticket dispensing systems and more particularly relates to a system and method for distributing lottery tickets.

BACKGROUND OF THE INVENTION

State-sponsored lotteries are now a popular and accepted method of generating revenue in place of taxes. One popular form of the lotteries is the Lotto-type game where the player selects his own numbers, for example by filling out a computer card, and receives a lottery ticket which has been printed with his selected numbers. A drawing is then held at a later time to determine the winning numbers. Another popular form of lottery uses the so-called instant lottery tickets, on which winning or non-winning combinations are preprinted before distribution so that no later drawing is necessary and the player knows immediately after purchasing his ticket whether or not he has won.

The usual system for distributing Lotto-type lottery tickets includes a large number of ticket-dispensing remote units located at drug stores, supermarkets, liquor stores and the like. Each unit is independent and is operated by the store owner, who customarily receives a portion of the ticket price for each lottery ticket sold. The usual system for distributing instant lottery tickets, on the other hand, is entirely clerical, with the tickets being stored in a drawer and counted out by hand. The store owner typically is responsible for keeping track of the number of tickets sold, making redemption payments up to a certain amount for certain types of winning tickets and for providing such sales and pay-out information to the state. The state in turn calculates the money due from or owing to the store owner and sends an invoice and/or money payment. Given the very large number of stores which now sell lottery tickets, it would be highly desirable to simplify the accounting procedure so as to avoid any mistakes or improprieties by the store owner and to assure proper and prompt payment of all monies due. It would also be valuable to the state to know on a daily basis whether each store owner has a sufficient supply of tickets, as well as how much money is due that day.

Another consideration in lottery ticket distribution is the speed with which the lottery tickets may be sold. It is a frequent occurrence in large cities for long lines of ticket buyers to form at lunch time or after work in order to buy tickets. As mentioned above, the ticket seller has conventionally had to count out and hand instant lottery tickets himself to the customers. It would be highly advantageous and to have a ticket-dispensing unit which would itself dispense instant or other lottery tickets at an outlet where they are easily accessible to the customer.

Still another consideration in a lottery ticket-dispensing unit is security. Particularly when instant tickets are being dispensed, the unsold tickets should be locked up in the unit or drawer to prevent their theft. Since the unit or drawer must be periodically opened to allow a new supply of lottery tickets to be inserted, it is desirable to keep track of when and how often the tickets are replaced. In addition, it may be necessary, for security reasons, to keep track of which lottery tickets were sold from which location, both to detect and prevent forgeries and unauthorized sales and to assist the customers in making complaints, suggestions or the like.

Particularly when a large number of tickets is stored within the dispensing unit, it is an advantageous feature of the present invention to dispense tickets stored in fan-fold form so that they may be rapidly fed out from storage without the risk of unintentionally dispensing too many tickets when separated tickets are stored. There is as yet no standardization in the size of the tickets, which come in various widths and lengths. Furthermore, tickets easily can slip in the dispensing mechanism, or for other reasons can be fed inaccurately. Therefore, it would be highly advantageous to provide a ticket dispensing mechanism to separate the tickets from one another while ensuring that the separation of the tickets occurs only at the joinder line therebetween, dispite the variation in the size of tickets and slippage or inaccuracy in the dispensing mechanism.

OBJECTS AND SUMMARY OF THE INVENTION

Accordingly, it is an object of the present invention to provide a system and method for distributing lottery tickets which avoid the above-described difficulties of the prior art.

It is another object of the present invention to provide a system and method for distributing lottery tickets in which sales data for a number of different ticket-dispensing units is automatically transmitted to a central data processor for system-wide accounting evaluation.

It is yet another object of the present invention to provide a system and method for distributing lottery tickets in which accounting information may be automatically calculated at each appropriate ticket-dispensing unit for print-out thereat.

It is still another object of the present invention to provide a method and system for distributing lottery tickets in which communication between the central data processor and the dispensing units is periodically established so as to transfer the sales data during limited intervals of time, thereby avoiding the need for a permanent communication link.

It is still another object of the present invention to provide a method and system for dispensing lottery tickets in which an accurate and current account of the ticket supply and monies due is available both to a controlling authority and to the sales agents.

It is a further object of the present invention to provide an apparatus for dispensing lottery tickets including a control panel mounted at the front and accessible to the sales agent and a dispensing outlet at the back and accessible to the customer so as to speed up the dispensing of tickets.

It is still a further object of the present invention to provide a method and apparatus for dispensing tickets in which the tickets are stored in a fan-fold strip or stream and are separable from each other along lines of weakness.

It is yet a further object of the present invention to provide a method and apparatus for dispensing tickets in which the tickets are separated by bursting the lines of weakness to provide an automatic mechanical alignment of the tickets.

It is yet a further object of the present invention to provide a method and apparatus for dispensing lottery tickets in which each access to a ticket storage area is detected and recorded.

In accordance with an aspect of the present invention, a system for distributing lottery tickets comprises central processing means, a plurality of remote units for dispensing lottery tickets, each remote unit including memory means for storing sales data indicating at least a number of lottery tickets dispensed by the respective remote unit, and communication means actuable for selectively placing the data processing means in communication with at least one remote unit, the remote unit transferring the sales data to the data processing means and the data processing means transferring at least message data to the remote unit through the communication means. Advantageously, the communication means includes dial-up modem means which may be actuated at pre-selected intervals, for example, once a day, to transmit data between the data processing means and one remote unit.

In accordance with this aspect of the present invention, a method of distributing lottery tickets comprises the steps of dispensing lottery tickets at a plurality of remote locations, memorizing at each remote location sales data indicating at least a number of lottery tickets dispensed at the respective location, transferring the memorized sales data from at least one remote location to a central data processing location over an electronic communication system and transferring message data from the central data processing location to the remote location over the system.

In accordance with a further aspect of the present invention, apparatus for dispensing lottery tickets comprises a box-like module having opposed front and back surfaces, ticket storage means within the module for storing a plurality of lottery tickets, control panel means mounted at the front surface of the module and being actuable for initiating dispensing of the lottery ticket, a dispensing outlet manually accessible at the back surface for receiving a dispensed lottery ticket from the ticket storage means and ticket dispensing means responsive to the control panel means for dispensing a lottery ticket from the ticket storage means to the dispensing outlet, whereby the dispensed lottery ticket may be manually removed from the apparatus.

In accordance with yet another aspect of the present invention, apparatus for dispensing tickets comprises ticket storage means for storing a plurality of tickets connected in a fan-fold stream headed by a leading ticket, the tickets being separable from each other along lines of weakness, transport means for feeding the stream of tickets from the ticket storage means along a predetermined dispensing path, separation means for separating the leading ticket from the stream along a leading line of weakness between the leading ticket and a next following ticket and manually accessible outlet means for receiving the separated ticket. Advantageously, the separation means includes a dull edge bursting blade moveably mounted adjacent a predetermined bursting position along the path, holding means for holding the stream of tickets against substantial deflection from the path at the bursting position, and bursting blade drive means for bringing the bursting blade into bursting contact with the stream of tickets at the bursting position to burst the leading ticket from the next following ticket. In a further development of this aspect of the present invention, the separation means includes feed alignment means including sensor means for detecting a present position of the leading ticket relative to the bursting position, means for determining a transport direction and a displacement distance necessary to bring the leading line of weakness to the bursting position and transport control means for generating a transport control signal indicative of the transport direction and displacement distance, the transport means being responsive to the transport control signal for transporting the ticket stream in transport direction by the displacement distance.

These and other objects, features and advantages of the present invention will become clear from the following detailed description of a preferred embodiment of the present invention taken in connection with the accompanying drawings, throughout which like reference numerals identify like elements and parts.

BRIEF DESCRIPTION OF THE DRAWINGS

FIG. 2A is an exemplary daily sales report produced by the present invention;

FIG. 2B is an exemplary weekly sales report produced by the system according to the present invention;

FIG. 2C is an exemplary weekly invoice produced by the system according to the present invention;

FIG. 2D is an exemplary current sales report produced by the system according to the present invention;

FIG. 3 is a front elevational view of the preferred embodiment of a ticket-dispensing unit according to the present invention;

FIG. 4 is a partial rear elevational view of the embodiment of FIG. 3;

FIG. 5 is a schematic view of the ticket transport mechanism of the preferred embodiment;

FIG. 6 is a schematic view of a leading edge ticket sensor of the preferred embodiment;

FIG. 9 is a perspective mechanical view of an imprinter assembly of the preferred embodiment;

GENERAL DESCRIPTION

Figure 1:
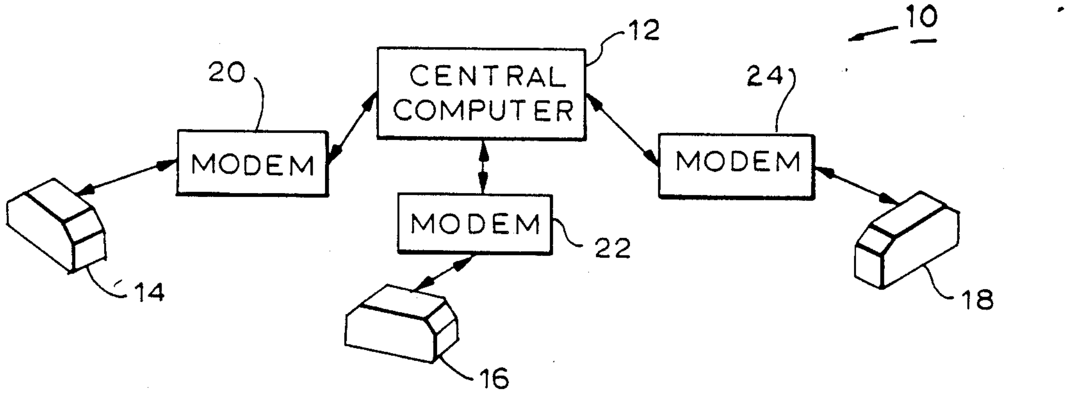
FIG. 1 is a schematic diagram illustrating a preferred embodiment of the system for distributing lottery tickets according to the present invention.

Referring now to the drawings, and initially to FIG. 1 thereof, a system 10 for dispensing lottery tickets includes a central computer 12 and three remote ticket-dispensing units 14, 16 and 18. Although the illustrated embodiment includes three such ticket-dispensing units, it will be understood that any number of units may be employed, and indeed it is anticipated that a very large number of units will be employed in a state-wide or nation-wide lottery system. For the purposes of the present description, the lottery will be assumed to be a state-wide lottery run by a state authority. However, the present invention is applicable to other lotteries such as nation-wide or city-wide lotteries.

Each unit 14, 16, 18 is located at a separate location across the state in, for example, grocery stores, liquor stores and the like, and functions completely independently of the other units. Each remote unit 14, 16, 18 is independently operated by a sales agent or vendor, generally the store owner who sells the lottery tickets as part of his business, receiving a percentage of the purchase price of each ticket sold from the state agency which runs the lottery. However, each unit 14, 16, 18 can be placed independently and selectively in communication with central computer 12 through a respective modem 20, 22, and 24. Each modem 20, 22, 24 is advantageously positioned within its associated unit 14, 16, 18 at the particular location, or alternatively, it may be located adjacent thereto. Advantageously, each of the modems 20, 22 and 24 is a dial-up modem which is actuated by its own conventional touch-tone telephone circuitry to access a telephone line between each of modems 20, 22, 24 and the central computer 12.

In accordance with an aspect of the present invention, each unit 14, 16, 18 independently records each ticket sale and stores sales data indicating at least the number of tickets sold and, more generally, the numbers, types and prices of different tickets sold. At periodic intervals, such as several times a day, once each day or once each week,, each unit 14, 16, 18 is placed in communication with the 12 by central computer dialing-up the respective modem 20, 22, 24. Once temporary communication is established, the sales data is transmitted from the units 14, 16, 18 to the central computer 12.

Central computer 12 operates as a central data processor to perform all the necessary accounting functions, including determining such information as the volume of sales and money due to or from each sales agent at his particular location. In addition, each unit 14, 16, 18 itself performs accounting functions on its own sales data. The transfer of the sales information from each unit 14, 16, 18 takes only a very short period of time, usually on the order of seconds, and so the time during which modems 20, 22 and 24 access the telephone lines is very brief, resulting in significant cost savings over systems which may require a continuous or extended connection over the phone lines to a central control station.

Thus, in accordance with the present invention, it is unnecessary for the sales agent to prepare any paperwork to keep track of ticket sales, to make any accounting of the sales or to otherwise report such sales to the state authority. Similarly, it is unnecessary for the state authority to physically collect such sales data from the numerous individual sales agents. Instead, central computer 12, at the appropriate time several times a day, once each day or once each week, simply actuates each modem 20, 22, 24 by dialing the telephone number assigned thereto, as is conventional, and the sales data is transmitted from the respective unit 14, 16, 18 to central computer 12 without further intervention or action by either the agent or the state authority. This insures that sales data is sent promptly to central computer 12 with minimum risk of tampering and without the possible delays or losses which occur when such data is sent by mail.

Furthermore, both the state authority using central computer 12 and the sales agent using his unit 14 have access to a current, up-to-the minute sales accounting of how many tickets have been sold and how much money is due. The state authority can then determine each sales agent's current stock of tickets and can resupply him before the stock runs out. This capability is commercially advantageous and helps to stabilize cash flow. Also, the information can be used to efficiently close out a particular game. Central computer 12 may account for each unit 14, 16 and 18 separately, and may also combine the sales data from all the units so as to provide a state-wide summary.

Of course, the sales data advantageously includes more data than just the number of tickets sold. It should include, for example, an agent number identifying the sales agent, a machine number identifying the particular remote unit, the sales agent's commission, frequently in the form of the percentage of the sales price, winning ticket values which the sales agent has redeemed, and the ticket purchase price, frequently in one dollar increments. Other sales data which may be automatically recorded by units 14, 16, 18 may be transmitted from an electronic cash register or entered by the agent on a control panel, as discussed below. This sales data, plus other types of sales data related to the particular use, may also be included and transmitted to central computer 12.

Remote units 14, 16, 18 are responsive to acounting data calculated from the respective sales data stored therein to print a report for the sales agent, summarizing the accounting results. The format of these reports may vary with the particular lottery system used, but may advantageously take the form of the exemplary reports illustrated in FIGS. 2A–D. FIG. 2A illustrates a daily sales report, FIG. 2B illustrates a weekly sales report, FIG. 2C illustrates a weekly invoice and FIG. 2D illustrates a current sales report. As shown, each report is individualized to the particular unit 14, 16, 18.

Since each unit 14, 16, 18 can record both the number of tickets sold at the particular location and also the amount of money paid by the sales agent in redeeming certain types of winning tickets, the reports are then a thorough reflection of the sales and redemption activity and may completely replace the use of invoices between the state authority and individual sales agents.

Central computer 12 can be programmed to dial up any modem 20, 22, 24 in off hours to interrogate it and get an up-to-the minute accounting, which is an advantage in increasing cash flow. Modems 20, 22, 24 may alternatively include a timer mechanism programmed so as to automatically dial up central computer 12 at preselected intervals to ensure that the sales data is regularly transmitted. For security reasons, the sales agent advantageously should not have the responsibility for connecting central computer 12 and modems 20, 22, 24.

Central computer 12 is operative to send message data indicative of messages to units 14, 16, 18. These messages may be individualized for the respective units 14, 16, 18, for example stating whether the particular sales agent is behind in his payments. Alternatively, central computer 12 may send the same message to all units 14, 16 and 18. Such a message may be, for example, advertising announcing a new game or a special jackpot. These messages may be intended either for the agent or for the customers and, as discussed below, an advantageous embodiment of unit 14, 16, 18 includes separate message display sections for the two types of messages.

Referring now to FIGS. 3 and 4, a preferred embodiment of unit 14 will now be described. It will be understood that units 14, 16, 18 and all others within the lottery ticket distributing system are intended to be identical. Therefore, while a detailed description is given only with respect to unit 14, it will be understood that this description applies equally well to all other units within the system.

Referring first to FIG. 3, unit 14 is constructed as a box-like module advantageously designed to rest upon the surface of a counter 26 or the like. Unit 14 includes a housing with a front surface 28 which, when unit 14 is positioned on counter 26 and is in operation, is intended to face the sales agent or vendor standing behind a counter 26.

An opposed back surface 30 of unit 14 is intended to face the customers when unit 14 is in operation. In accordance with an advantageous aspect of the present invention, a control panel 32 including all necessary agent-operated controls is mounted at front surface 28, while a dispensing outlet 34 is manually accessible at back surface 30 by the customers. Thus, the sales agent may quickly and efficiently enter a sales command, for example in the form of the number of tickets to be dispensed, on control panel 34 at front surface 28, while the tickets are automatically presented in response to the command in dispensing outlet 32 at back surface 30. This structure eliminates the need for the sales agent to physically receive the lottery tickets from unit 14 and to personally hand the lottery tickets to the customer, as is done in conventional lottery ticket dispensers.

As illustrated in FIG. 3, control panel 32 is mounted at front surface 28 on an upper portion 36 thereof. Upper portion 36 is inclined relative to front surface 28 for ergonomic reasons; that is, to permit comfortable access to control panel 32. The angle of inclination of panel 32 is limited so that control panel 32 remains in substantially opposed relation to back surface 30. The angle of inclination is limited not only so that control panel 32 may be easily viewed and operated by the sales agent, but also so that it will be substantially blocked from view by any customer standing in front of counter 26 and facing back surface 30. This minimizes the chances of any interference by the customer in reaching towards control panel 32 in an attempt to operate unit 14 in an unauthorized manner.

Control panel 32 includes a keypad 37 having a plurality of push-buttons 38 for entering data and commands into a control circuit 40 (FIG. 10) which is located inside of the unit 14. Control circuit 40 is a microprocessor-based circuit or minicomputer which controls the operation of unit 14. It will be described in greater detail below.

Push-buttons 38 include numerical buttons bearing the digits 0–10, and an entry button for entering the corresponding numbers into control circuit 40. Push-buttons 38 further may include a cash button, a report button, a sign-on button, a ticket length load button, a storage access button, and all other buttons necessary for entering all appropriate data and commands in accordance with the functions described below.

In particular, when unit 14 has been activated, any number of tickets from 1 through 999 may be dispensed simply by depressing the appropriate numerical push-button and the entry button 38. Thus, if the sales agent depresses the numerical push-button 38 bearing the digit "1", a confirming number will appear on an operator LCD display 42, discussed below, and the sales agent may depress entry button 38 and a single lottery ticket will be dispensed and deposited in dispensing outlet 34 at back surface 30 (FIG. 4). The customer simply reaches into dispensing outlet 34 to remove the ticket.

Alternatively, if the sales agent depresses the numerical push-button bearing the digit "5" and then the entry button, remote unit 14 will automatically deposit five separated lottery tickets into dispensing outlet 34. There is no need for the sales agent either to count out the tickets or to physically receive the tickets and hand them to the customer. This significantly speeds up the ticket selling process, as the sales agent may concentrate on receiving money and giving change, a task which is both easier to perform and more likely to be accurate when the agent is not handling tickets.

Figure 10:
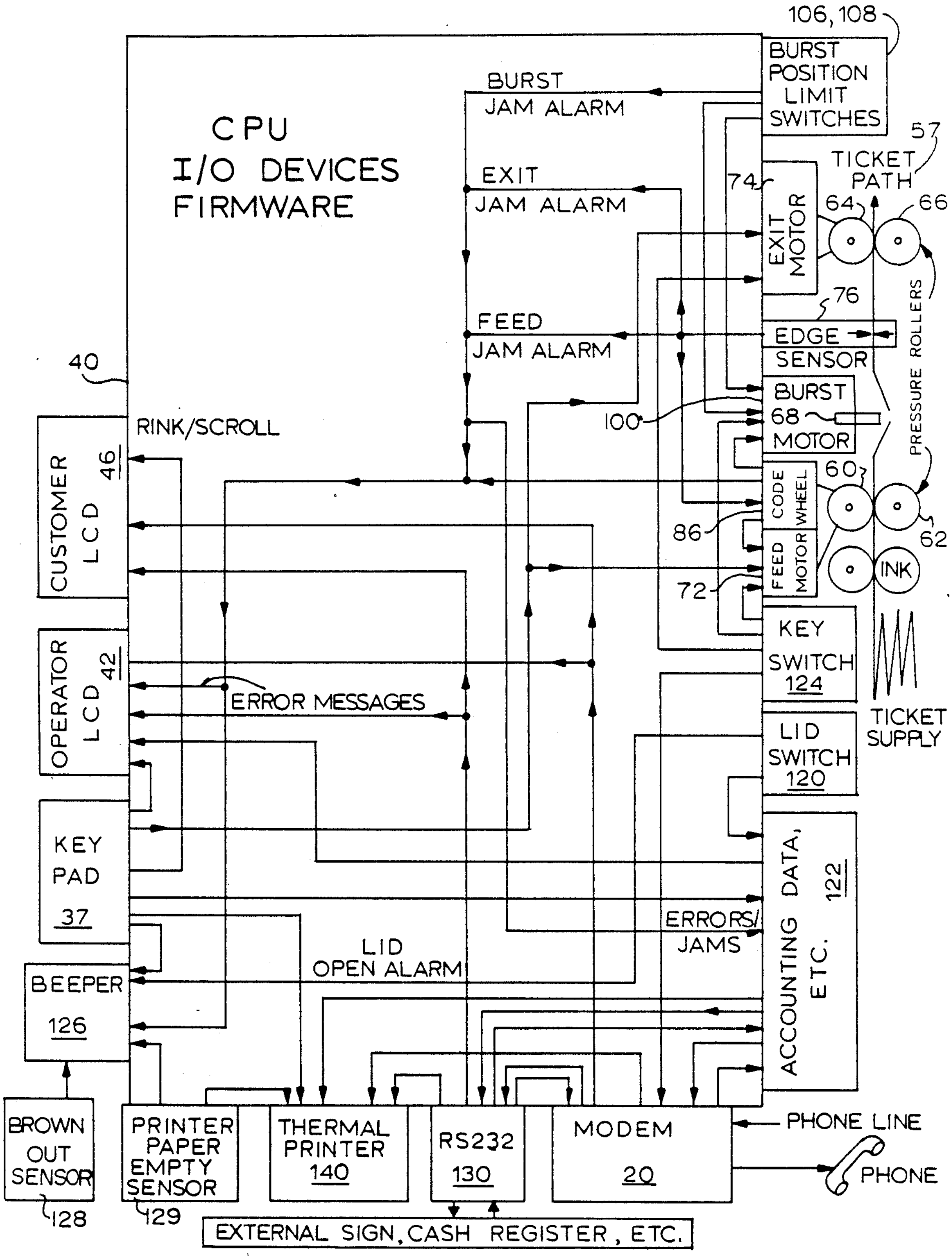
FIG. 10 is a functional block diagram of the preferred embodiment.

Each ticket sold is counted, advantageously in response to operation of the mechanism which provides a separated ticket to dispensing outlet 34, and the number is stored as sales data in memory within control circuit 40 (FIG. 10). Other sales data, such as the price of the tickets also may be stored in memory. When communication with central computer 12 is established, the sales data is send out from the memory by control circuit 40 and fed out over the phone line to the central computer 12.

Control circuit 40 similarly receives message data from the central computer 12 and stores it in the memory along with the sales data and the accounting data calculated therefrom. The report push-button 38 causes a selected one of the reports illustrated in FIGS. 2A–D to be printed, for example on a tape by a thermal printer 140 (FIG. 10) and issued in the front surface 28, through a slot 27.

As mentioned above, central computer 12 may send messages to unit 14. Some of these messages will be intended for the sales agent and not for customers, and so are considered to be control messages rather than advertising messages. To display these control messages, a display device, such as the conventional LCD display 42 is provided in control panel 32 on the inclined surface 36 adjacent keypad 37. In accordance with conventional techniques, central computer 12 can transmit message data indicative of these messages through modem 20 whenever modem 20 is actuated to transmit sales data from unit 14 to central computer 12. This down-loading of message data is achieved without any need to request the same by the sales agent. The placement of LCD display 42 on inclined surface 36 further shields the control message displayed thereon from the eyes of customers.

Alternatively, the control or other messages may be printed by thermal printer 140 on the tape and presented through slot 27.

A key 44 is also provided on control panel 32 for the purpose of controlling the operating mode of unit 14. In a locked or "off" mode of operation, unit 14 is disabled both from receiving commands from control panel 32 and from communicating with central computer 12 through modem 20.

In a "normal" mode of operation, unit 14 is enabled to receive commands entered on control panel 32 and to dispense tickets, but remains disabled from communication with central computer 12.

In a "communication" mode of operation, unit 14 is enabled for receiving commands through control panel 32 and is responsive to modem 20 to permit two-way communication between the unit 14 and the central computer 12. In the communication mode, unit 14 and modem 20 will answer a telephone call from central computer 12, or may be actuated, as by dialing the telephone circuitry within modem 20 to place a telephone call to central computer 12, and to thereafter exchange information. Key 44 has three different positions respectively associated with the three different operating modes of unit 14.

Advantageously, key 44 must be inserted into unit 14 and turned to place unit 14 in either of the normal or communication modes, and is removeable from unit 14 only when it is in the locked position to place unit 14 in the locked mode.

A second message display device 46, advantageously an LCD device, is located at back surface 30, advantageously on an upper inclined portion 48 thereof, for easy viewing by the customers. When message data from central computer 12 contains an advertising slogan or the like, a corresponding message will be displayed on LCD display 46. Control circuit 40 in remote unit 14 distinguishes between the two types of data and selects the appropriate LCD device 42, 46 or thermal printer 140 (FIG. 10) to display the message.

TICKET SEPARATOR OR "BURSTER"

A highly advantageous aspect of the present invention is that the lottery tickets within unit 14 are stored in a fan-fold strip or "stream" and are not, as in most conventional lottery tickets dispensers, stored in stacks of pre-cut tickets for individual dispensing. Prior art ticket dispensers which did store the tickets in pre-cut form had the difficulty that two tickets could be dispensed accidently instead of a single ticket when two tickets within the stack were stuck together.

The present invention essentially eliminates the risk that two or more tickets may be dispensed unintentionally. This is accomplished, in part by storing the tickets in fan-fold form, and by providing a highly advantageous ticket separation or "burster" mechanism for separating the leading ticket from the stream of tickets. This novel separation mechanism alleviates a difficulty which arises when tickets are to be dispensed from a fan-fold stream.

In particular, a most common item fed from a fan-fold stream is the paper used to feed a printer controlled by a computer or the like. Such paper is relatively thin and flexible and often has a column of perforations or holes at either side so that it can be driven by a tractor feed mechanism of the printer. Such a feed mechanism provides automatic lengthwise and widthwise alignment of the paper as it is fed through the printer. However, lottery tickets conventionally do not have such columns of perforations and, indeed, are constructed from laminated layers of paper or cardboard so as to be relatively stiff.

The problem faced and solved by the transport mechanism in accordance with the present invention is how to ensure that each ticket as it becomes the leading ticket will be separated from the next following ticket precisely along the joinder line between the tickets. In such a fan-fold scheme, a line of weakness, for example a perforation line, is provided to define each ticket and to permit fan-folding of the stream of connected tickets. In the illustrated embodiment shown in FIG. 5, each fold contains a single ticket, for clarity of illustration, but in a preferred embodiment a number of tickets, for example five, may be provided within each fold.

Simply to provide a knife edge or cutting blade to slice through the stream of tickets is disadvantageous, since such a knife edge may cut through the tickets at any point, such as in the middle of a ticket. Therefore, a highly precise alignment device usually must be provided with such a knife edge to bring it into precise alignment with the joinder line between tickets.

The present invention provides a novel separation mechanism which bursts the leading ticket from the next following ticket along the line of weakness therebetween, instead of cutting the two tickets apart. Not only does this inherently reduce the risk of producing only half a ticket, but also it provides an automatic mechanical alignment of the tickets to their proper position for bursting.

A separate alignment mechanism is also provided to adapt the burster mechanism to tickets of different, selected lengths and cooperates with the burster mechanism to provide precise, rapid separation of each ticket from the stream.

More particularly, an advantageous embodiment of the ticket transport/separation system in unit 14 is schematically illustrated in FIG. 5. A plurality of individual tickets 49 are connected in a fan-fold strip or stream 50 which is drawn from the top of a stack 51. The tickets 49 are provided by the state authority in fan-fold stack form, which is compact and easily transportable, especially when including, for example, as many as 1500 tickets. The illustrated embodiment shows a single ticket 49 within each fold, but it will be understood that a greater number of tickets could be provided within each fold.

Referring now to FIG. 6, the ticket strip 50 is headed by a leading ticket 52 which is connected to a next following ticket 54 along a line of weakness 56, and it will be understood that each successive following ticket is separable from its neighbors by similar lines of weakness.

Returning to FIG. 5, ticket strip 50 is fed along a dispensing path 57 from a storage area 58 holding stack 51 within unit 14 towards the dispensing outlet 34, and is transported along dispensing path 57 by a transport mechanism including opposed upper and lower feed rollers 60, 62 and opposed upper and lower exit rollers 64, 66.

Figure 7:
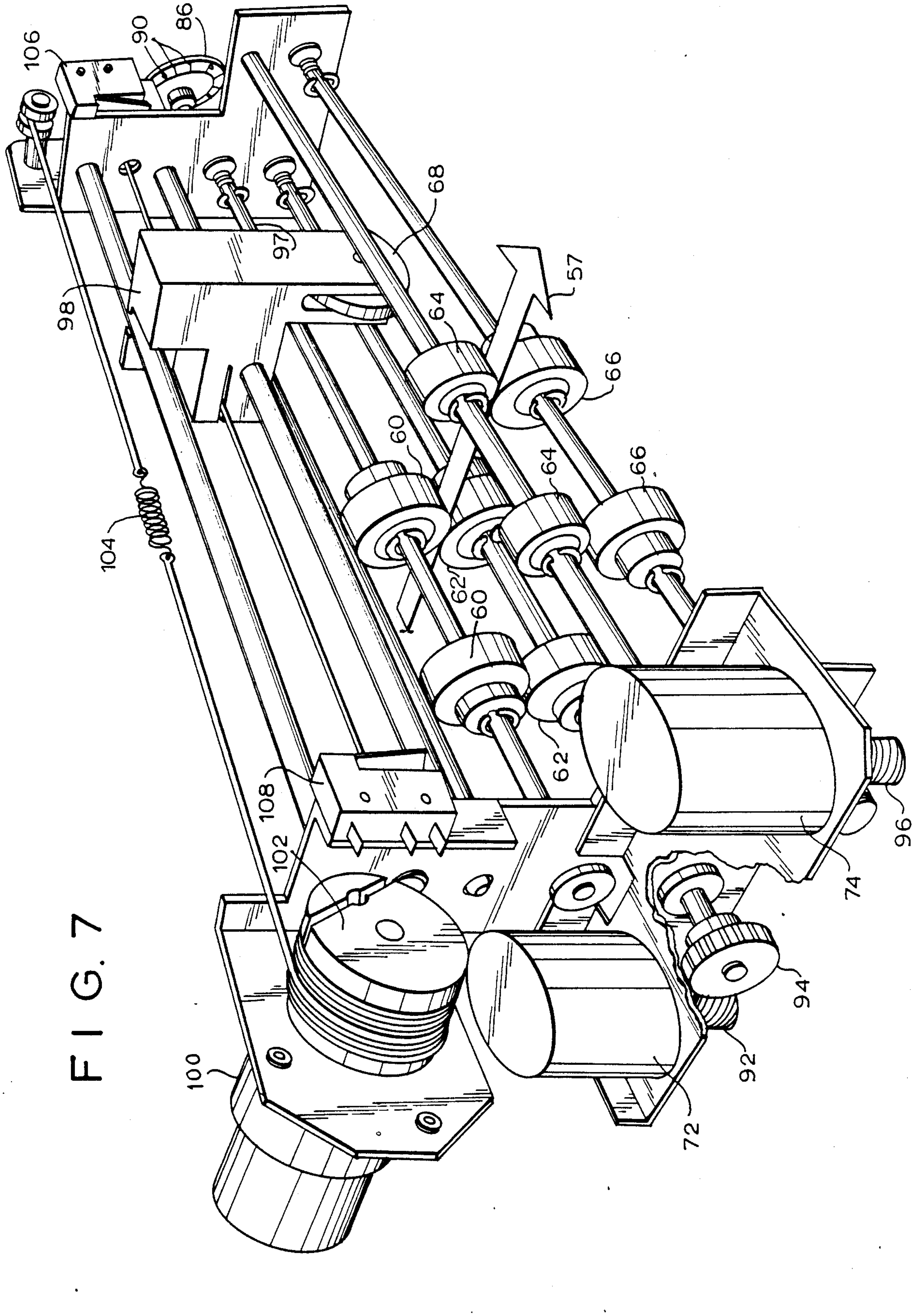
FIG. 7 is a perspective view of the ticket drive and burster assembly of the preferred embodiment.

The leading ticket 52 is separated from next following ticket 54 by a burster wheel 68 positioned adjacent dispensing path 57 at a bursting position 70. Consequently, feed rollers 60, 62 (also see FIG. 7) are driven separately from exit rollers 64, 66 so that feed rollers 60, 62 transport the stream of tickets 50 from the storage area 58 up to the bursting position 70. Exit rollers 64, 66 operate as "kick-out" rollers to discharge the separated leading ticket 52 from dispensing path 57 into dispensing outlet 34. As shown in FIG. 7, a drive motor 72 is provided to drive feed rollers 60, 62, while a separate "kick-out" motor 74 is provided to drive the exit rollers 64, 66.

When stream of tickets 50 has been transported to bring the line of weakness 56 between the leading ticket 52 and next following ticket 54 to the bursting position 70, a burster wheel 68 is moved into bursting contact therewith in order to separate leading ticket 52 from next following ticket 54. As indicated schematically in FIG. 5, and in perspective in FIG. 7, burster wheel 68 is advantageously in the form of a circular burster blade which, in an advantageous aspect, has a dull, rounded edge which does not cut stream of tickets 50, but rather exerts pressure against the top of stream of tickets 50 in a direction to deflect it from dispensing path 57.

When line of weakness 56 is at bursting position 70, exit rollers 64, 66 grip a portion of the leading ticket 52, while exit feed rollers 60, 62 similarly grip a following portion of the stream of tickets 50, with the result that stream of tickets 50 is held between the two sets of rollers against substantial deflection from dispensing path 57. This enables the bursting force from bursters 68 to separate the tickets 52, 54. However, the grip on stream of tickets 50 by upper and lower feed rollers 60, 62 and upper and lower exit rollers 64, 66, respectively, permits a slight deflection of strip of tickets 50 from dispensing path 57 in response to pressure exerted by the burster wheel 68. This slight deflection provides a highly advantageous and novel alignment system in accordance with the present invention. The alignment system operates as follows.

In order for burster wheel 68 to effectively burst the leading ticket 54 from stream tickets 50 at line of weakness 56, it must be sufficiently aligned with lines of weakness at least close to the line. A separate alignment mechanism, discussed below, is used to bring line of weakness 56 to within at least a predetermined incremental distance of bursting position 70. Even within this incremental distance it is still advantageous to have line of weakness 56 precisely aligned with bursting position 70, for best results. As in any such system thus is a certain amount of slippage and tolerance which tends to prevent perfect alignment. In accordance with the present invention, the very action of burster wheel 68 in combination with exit rollers 64, 66 and feed rollers 60, 62 provides a mechanical alignment to correct any errors within the incremental distance.

Figure 8A:
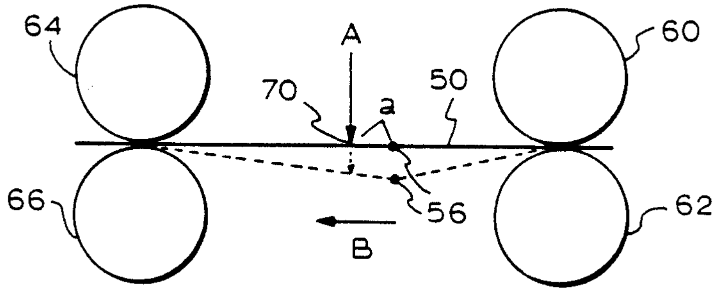
FIG. 8A is a diagrammatic illustration for explaining the alignment process of the ticket drive and burster assembly of FIG. 7.

Specifically, as illustrated in FIG. 8A, the force from burster wheel 68 is exerted at bursting position 70 along the direction of arrow A. In FIG. 8A, it is assumed that line of weakness 56 has fallen short of bursting position 70 by a distance a. Since the force from burster wheel 68 is not exerted directly on the line of weakness 56, the tickets will not immediately begin to burst apart but instead will be deflected slightly downwardly and will tend to bend first at the line of weakness 56 into a V shaped configuration indicated in dashed lines in the drawings. Consequently, tickets 52 and 54 will tend to slip longitudinally along the dispensing path 57 so as to bring the low point of the V-shaped ticket-array into contact with the burster wheel.

Figure 8B:
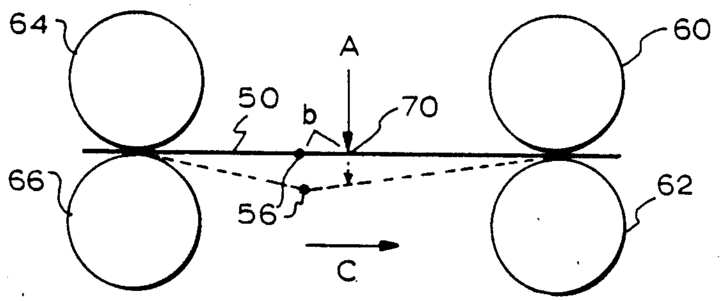
FIG. 8B is a second diagrammatic illustration for explaining the alignment process of FIG. 8A.

In FIG. 8A, the ticket strip 50 moves in the direction of arrow B until the line of weakness 56 is properly aligned with bursting position 70. Correspondingly, as shown in FIG. 8B, when the line of weakness 56 is slightly in advance of the bursting position 70 by distance b, the force of burster wheel 68 will cause the strip 50 to move slightly along the dispensing path in the direction of arrow C, reverse-feeding the strip 50 to again bring line of weakness 56 into precise alignment with bursting position 70. This is an advantage of the burster mechanism of the present invention If tickets 49 are always of a predetermined, uniform length, the position of burster wheel 68 along dispensing path 57 could be predetermined and the mechanical self-alignment action just described could be sufficient to maintain proper alignment. The system according to the present invention has the additional feature, however, of accepting and dispensing tickets of different lengths and includes an alignment mechanism for bringing line of weakness 56 to within at least a predetermined incremental distance of bursting position 70 regardless of the length of tickets 49.

As illustrated in FIG. 5, a ticket sensor 76 is positioned along dispensing path 57 at a sensing position 78 downstream from bursting position 70 and upstream of the exit rollers 64 and, 66. Ticket sensor 76 operates as a leading edge detector to detect the leading edge 80 of leading ticket 52 (FIG. 6) after the previous leading ticket has been separated and dispensed by the action of upper and lower exit rollers 64, 66 while the feed rollers 60, 62 are held stationary.

As shown in FIG. 6, ticket sensor 76 is a conventional optical sensor having a U-shaped cavity 82 through which the ticket strip 50 passes to interrupt a light beam supplied to a light sensor 84. In accordance with known principles, light sensor 84 will detect the light beam from the time when the previous leading ticket is dispensed until the time that leading edge 80 of leading ticket 52 enters cavity 82 to interrupt the light beam. The distance between ticket sensor 76 and bursting position 70 is predetermined in the construction of the dispensing unit 14. If this predetermined distance is, for example, ½ inch and tickets 49 are identified as 2 inches long, then detection of leading edge 80 will indicate that the strip of tickets 50 must be driven an additional 1½ inch to bring line of weakness 56 to bursting position 70. The spacing of exit rollers 64, 66 relative to feed rollers 60, 62 is advantageously such that both leading ticket 52 and next following ticket 54 will be respectively gripped thereby regardless of the length of leading ticket 52. The length of tickets 49 may therefore vary, but only within a predetermined range, for example, 1½ inches to 2 inches. The length may be entered on control panel 32 by actuation of length load push-button 38 if tickets of different lengths are being sold, or may be set by the central computer 12. Of course, if longer or shorter tickets are to be used, the relative positions of feed rollers 60, 62, exit rollers 64, 66, bursting position and sensing position 78 may be adjusted. This creates the appropriate gripping of the ticket strip 50 by the two pairs of rollers. Wider spacing may be acceptable depending on the rigidity of tickets 49.

Referring now to FIGS. 5 and 7, in order to achieve the proper movement of stream of tickets 50 to bring line of weakness 56 to bursting position 70, the illustrated embodiment uses an alignment mechanism including a code wheel 86 and code wheel sensor 88. In accordance with known techniques, code wheel 86 is divided into a plurality of divisions 90 each corresponding to a single predetermined incremental distance of ticket movement along dispensing path 57. Code wheel sensor 88 detects the rotation of code wheel 86 through each division 90 and produces a pulse in response thereto. As shown in FIGS. 5 and 7, the code wheel is mounted on the same shaft 97 as the upper feed rollers 60 which move the ticket strip 50. Code wheel 86 will therefore measure each incremental distance moved by stream of tickets 50 and control circuit 40 (FIG. 10) counts the number of pulses to permit movement of strip of tickets 50 by the appropriate distance to bring line of weakness 56 to bursting position 70.

Control circuit 40 also determines the direction of movement, since stream of tickets 50 will need to be forward fed or reverse-fed, depending on the particular unit 14 and the length of tickets 49. For example, if the predetermined incremental distances is ¼ inch and stream of tickets 50 must be moved 1½ inches in the forward direction to bring line of weakness 56 into bursting position 70, feed rollers 60, 62 are driven forwardly until code wheel 86 produces six pulses, moving the stream of tickets 50 forwardly for six incremental distances to total 1½ inches. In actuality, the incremental distance will generally be much smaller than ¼ inch, and the number of pulses provided will be correspondingly much greater so as to provide sufficient accuracy of alignment. Code wheel 86 is controlled to produce the proper number of pulses by control circuit 40 in response to the previously-entered ticket length setting stored therein. It will be apparent that tickets of a greater or lesser length may readily be accommodated by producing a greater or fewer number of pulses from code wheel 86.

FIG. 7 is a more structurally complete illustration of the ticket drive and bursting assembly. In particular, it will be seen that drive motor 72 operates through a gear train including gears 92 and 94 to drive lower feed 62 directly and upper feed roller 60 thereby, the "kick-out" motor 74 drives lower exit rollers 66 directly through a gear train partially illustrated at 96. Upper exit rollers 64 are driven by rollers 66.

Code wheel 86 is shown mounted on the same shaft 97 on which upper feed roller 60 is mounted to provide an accurate measurement of ticket displacement. Although driven lower feed roller 62 may slip while stream of tickets 50 is stationary, upper feed roller 60 is rotated only when stream of tickets 50 moves, thereby providing an accurate output from code wheel 86.

Burster wheel 68 is shown mounted on a burster block 98 driven by a burster motor 100 through a cable spool arrangement 102 including tensioning spring 104. When burster block 98 is moved from the illustrated rest position towards interception with dispensing path 57 through the action of cable spool device 102, burster wheel 68 will come into contact with stream of tickets 50 at the side thereof initially and then across stream of tickets 50 to burst the same apart. Limit switches 106, 108 provide respective indications of the limit positions for burster block 98 to prevent burster block 98 from crashing into the side of the mechanism.

Burster block 98 is moved from right to left to burst the leading ticket 52, then left to right to burst the next leading ticket 54, and so on. Limit switches 106, 108 will therefore indicate the position of burster block 98 after each bursting motion. Thus, each bursting motion of burster block 98 from left to right or right to left represents the separation of a single ticket 49 and so may be used to digitally count the number of tickets sold. Each bursting motion may be sensed through one of limit switches 106, 108 or by a separate sensor, and control circuit 40 is responsive thereto to increment the number of tickets sold as part of the stored sales data. The longest contemplated ticket length which may be input on control panel 32 is selected to be less than twice the shortest contemplated ticket length. For instance, the shortest length may be 1 ¼ inches while the longest length is 2 inches. This is a security measure to prevent a dishonest employee from setting the stored length to twice the actual ticket length, thus dispensing two tickets for each bursting motion of burster block 98. Of course, if the length is set only at central computer 12 or only with a special access code at control panel 32, this length limitation is unnecessary.

IMPRINTING

In accordance with a further aspect of the present invention, vendor identification data, such as the name and address of the sales agent, is automatically printed on each ticket 49 prior to dispensing. This assists the customer if he has any complaints by identifying where and from whom he bought the ticket, or if the particular game permits only the sales agent who sold ticket 49 to redeem it. This is also useful in detecting fraud should dispensing unit 14 be stolen and set in operation at another location.

As illustrated in FIG. 9, an imprinter assembly 110 includes an imprinter roller 112 including an impression of the vendor identification data, a pressure roller 114 in driving contact with imprinter roller 112 on the opposite side of dispensing path 57 so as to receive stream of tickets 50 therebetween, and an inker roller 116 in rolling contact with imprinter roller 112 so as to provide an ink supply thereto. Imprinter assembly 110 is not driven by any motor, but rather imprinter and pressure rollers 112, 114 are rotated by the motion of the strip of tickets 50 therebetween, while inker roller is rotated by the rotation of imprinter roller 112 to bring the impression on imprinter roller 12 into inked contact at least once with each ticket 49. Of course, the position of the inked contact on ticket 49 will depend on the length thereof, but the diameter of imprinter roller 112 is calculated so that the vendor identification data will appear at least once on each ticket 49 within the predetermined range of ticket lengths.

ACCESS MONITORING

A further security feature of unit 14 is intended to alert the sales agent to theft of tickets normally stored in unit 14. As mentioned above, the tickets are normally stored in a fan-fold stack 51 in storage area 58 of unit 14. Storage area 58 is accessible only through a normally closed locked door 118 (FIG. 4). A lid switch 120 (see lower right-hand portion of FIG. 10) is connected to the door 118 and to control circuit 40 so as to detect each opening of the door permitting access to the interior storage area 58 to remove tickets therefrom and deposit tickets therein. Each such opening may cause an alarm to sound and is also recorded in control circuit 40. Operation of an access control push-button 38 on control panel 32 will produce a print-out of the number of openings each day on the tape issued through the slot 39—the same tape which is used to provide various reports. The sales agent, being financially responsible for each ticket received from the state authority, will be aware of each time he has opened door 118 to deposit tickets. Therefore any additional openings will indicate to the sales agent that someone else has been tampering with unit 14 and provides an additional security check. Such an access detecting system may also be applied to a locked drawer or other area in which tickets may be stored.

CONTROL CIRCUIT

FIG. 10 is a functional block diagram of control circuit 40 in unit 14 and the various devices and systems which it controls through software and firmware. Briefly reviewing the previously discussed features, modem 20 provides the conduit for message data from central computer 12 over the phone lines and the sales data from unit 14 stored in the memory 122. Proceeding counterclockwise from modem 20, the sales data, accounting data and the like are stored in memory 122, advantageously in the form of a random access memory.

Lid switch 120 which detects each opening of door 118 provides its data to memory 122. Key switch 124 detects the three different positions of key 44 and provides a signal to modem 20 to permit communication between modem 20 and unit 14 only in the communication mode, and signals to exit or "kick-out" motor 74, drive motor 72 and burster motor 100 to permit dispensing of tickets in the normal and communication modes.

Code wheel 86 receives signals from leading edge ticket sensor 76, which also provides a feed-jam alarm signal an exit jam alarm signal. Burst position limit switches 106, 108 similarly provide a burst-jam alarm signal should the burster assembly become inoperative, as well as a count of tickets sold.

Customer LCD display 46 and operator LCD display 42 may be controlled through keypad 37 to blink or scroll the respective messages. Operator LCD display 42 is also adapted to display error messages generated by control circuit 40 in response to various alarm signals, such as those generated by lid switch 120, ticket sensor 86, etc.

Control panel keypad 37 is operative to send signals to all the various devices, while beeper 126 provides an alarm indication for a variety of error conditions, including an electrical "brown-out" sensed by brown-out sensor 128, a lid opening sensed by lid switch 120, jam alarms from drive motor 72, burst motor 100 and burst limit switches 106, 108, a printer paper empty sensor 129 and in response to operation of keypad 37.

It is contemplated that the sales agent will redeem certain types of winning tickets and will deposit the money from all sales into a cash register Such a cash register may be electronic and connected to control circuit 40 through an RS-232 cable 130 to automatically record this type of sales data. An additionally, an external sign may also be attached to control circuit 40 by RS-232 cable 130 to receive the same type of advertising messages as displayed on customer LCD display 46. For example, the external sign may be mounted outside the store where unit 14 is located.

Figure 11:
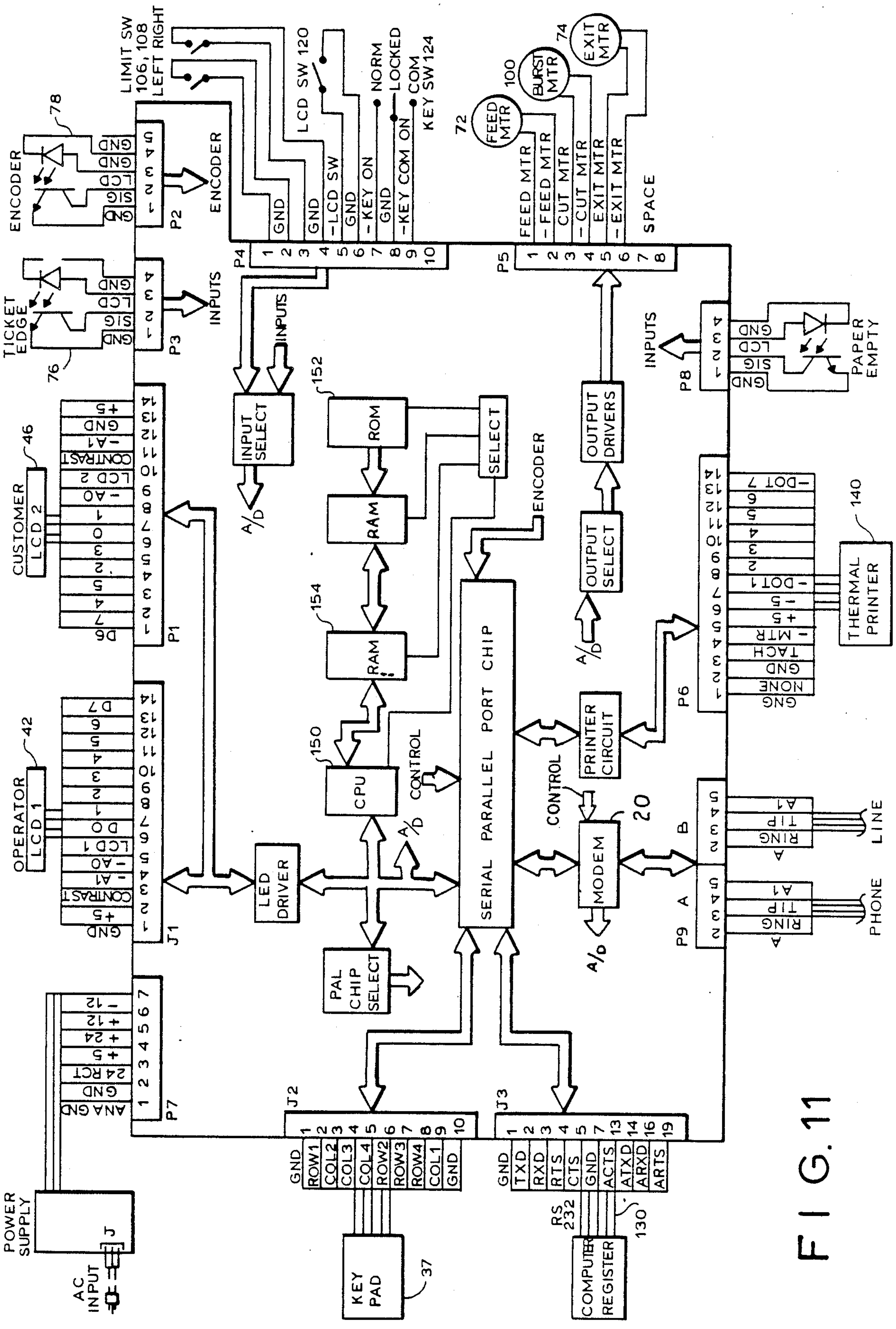
FIG. 11 is an electronic block diagram corresponding to FIG. 10.

FIG. 11 is a more detailed electronic block diagram corresponding to functional block diagram FIG. 10 and illustrates the currently contemplated best mode circuit elements for implementing the difference devices and operations of control circuit 40 and unit 14.

FLOW CHARTS

Figure 12:
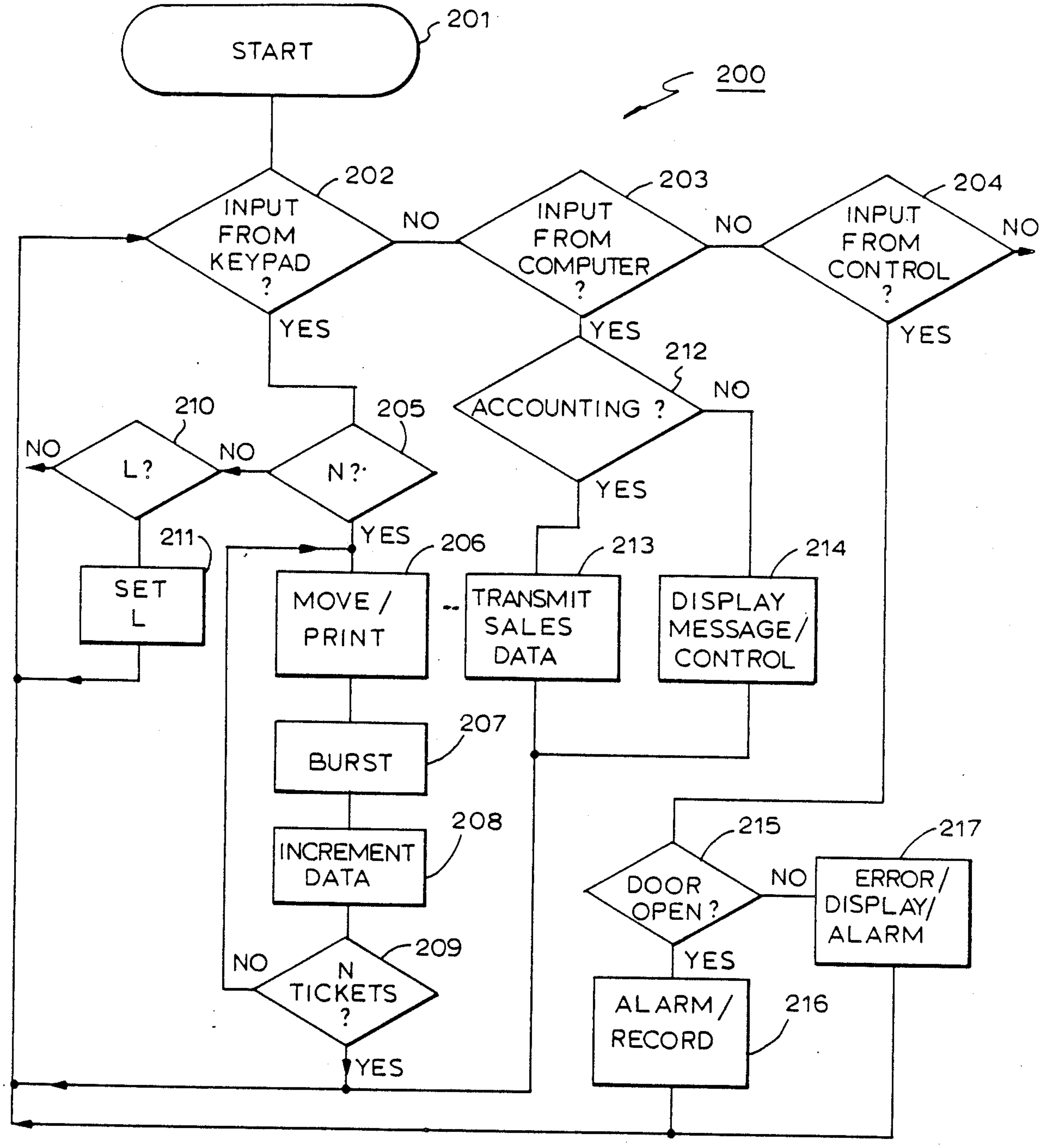
FIG. 12 is a flowchart illustrating certain operations of the preferred embodiment.

FIG. 12 is a flow chart illustrating a control program 200 for unit 14 in performing some of the above-described functions. In accordance with known techniques, a CPU 150 (FIG. 11) within control circuit 40 executes control programs such as program 200 out of a read-only memory (ROM) 152. Control program 200 starts at step 201 and thereafter in steps 202, 203 and 204, determines whether CPU 150 has received an input from keypad 37, an input from central computer 12 or an input through another portion of control circuit 40 from the various devices connected thereto. Otherwise, control proceeds to another portion of program 200 to perform a function not illustrated in FIG. 12. At step 202, if an input was received from keypad 37, program 200 proceeds to step 205, wherein it is determined whether a ticket number command has been received, ordering the dispensing of N tickets. If such a ticket number command has been received, program 200 proceeds to step 206 wherein stream of tickets 50 is moved to bring line of weakness 56 to bursting position 70, with a following ticket being printed during such movement. In step 207, leading ticket 52 is burst from next following ticket 54 and in step 208 the dispensing of another ticket is recorded as sales data. In step 209, it is determined whether N tickets have been dispensed and if not, control returns to step 206 so that the next leading ticket 52 may be dispensed. If N tickets have been dispensed in step 209, control returns to step 202. In step 205, if a ticket number command has not been received, program 200 proceeds to step 210 wherein it is determined whether the length L of the tickets needs to be set. If so, in step 211 the new length is stored and control returns to step 202. If at step 210 it is determined that some other command has been entered from keypad 37, control proceeds to another portion of program 200 (not illustrated) where such command may be executed.

If instead of an input from keypad 37, an input from central computer 12 has been received, then program 200 proceeds from step 203 to step 212 to determine whether an accounting procedure is to be followed. If so, program 200 proceeds to step 213, wherein sales data may be transmitted to central computer 12 and/or accounting data may be calculated, and then control returns to step 202. Of course, accounting data may also be calculated at other times without a specific input from central computer 12. On the other hand, if at step 212 it is determined that something other than an accounting procedure is to follow, program 200 proceeds to step 214 wherein it operates in response to any message or other data received from central computer 12 to display a message and to operate under the control of central computer 12 to perform the commanded function, and thereafter control returns to step 202.

If it is determined at step 204 that an input is received from some device connected to control circuit 40, program 200 proceeds to step 215 wherein it determines whether lid switch 120 has detected the opening of door 118 to ticket storage area 58. If so, control proceeds to step 216 wherein the alarm may be sounded and the access to ticket storage area 58 is recorded. If at step 215 control program 200 determines that some other input has been received from devices connected to control circuit 40, program 200 proceeds to step 217 wherein the appropriate action recognizing an error, displaying an error message, sounding an alarm or other appropriate action is taken, whereafter control returns to step 202.

FIG. 12 illustrates only some of the functions of unit 14 and illustrates those only in very general terms. It will be understood by one skilled in the art that the order of some of the steps in program 200 may be altered, with additional steps being added to handle the additional functions described above and to include further functions consistent with the described operation of unit 14.

The above description has been given on a single preferred embodiment of the system and method for distributing lottery tickets in accordance with the present invention, and it will be apparent to one skilled in the art that many modifications and changes may be made without departing from the spirit or scope of the present invention. For instance, the burster mechanism is advantageous for all types of tickets and the like stored in a fan-fold stream. Also, the unit could be adapted for Lotto-type games by the addition of a card reader and controllable printer receiving the separated tickets, or the unit could be adapted as a player-activated terminal, for example in an isolated area. Therefore, the scope of the present invention should be determined by reference to the appended claims.

We claim:

1. Apparatus for dispensing lottery tickets, comprising:

a box-like module having opposed front and back surfaces;

ticket storage means within said module for storing a plurality of lottery tickets;

control panel means mounted at said front surface of said module and being actuatable for initiating dispensing of a lottery ticket;

a dispensing outlet manually accessible at said back surface for receiving a dispensed lottery ticket from said ticket storage means; and ticket dispensing means responsive to said control panel means for dispensing a lottery ticket from said ticket storage means to said dispensing outlet, whereby said dispensed lottery ticket may be manually removed from said, apparatus.

2. Apparatus according to claim 1, wherein said control panel means is actuable to generate a ticket number specification signal indicating a selected number of tickets, said ticket dispensing means being responsive to said ticket number specification signal to dispense said number of tickets.

3. Apparatus according to claim 2, wherein said lottery tickets stored within said ticket storage means are connected, and wherein said dispensing means includes means for individually separating each ticket to be dispensed from the remaining tickets regardless of the number of tickets being dispensed in one order.

4. Apparatus according to claim 1, wherein said lottery tickets stored within said ticket storage means are connected in a fan-fold stream, said lottery tickets being delineated from each other along lines of weakness, and said separating means including means for bursting said lottery tickets apart along said lines of weakness.

5. Apparatus according to claim 2, wherein said module further includes message display means mounted at said back surface adjacent said dispensing outlet.

6. Apparatus according to claim 5, further comprising central data processing means and means for selectively connecting said data processing means with said module for transmitting at least message data thereto, said message display means being responsive to said message data to display a message indicative thereof.

7. Apparatus according to claim 6, wherein said module includes a second message display means mounted at said front surface adjacent said control panel means, said central data processing means further transmitting control message data to said module and said second message display means being responsive to said control message data to display a control message indicative thereof.

8. Apparatus for dispensing lottery tickets, comprising:

ticket storage means for storing a plurality of lottery tickets connected in fan-fold stream headed by a leading ticket, said tickets being separable from each other along lines of weakness;

transport means for feeding said stream of tickets from said ticket storage means along a predetermined dispensing path;

separation means for separating said leading ticket from said stream of tickets along a leading line of weakness between said leading ticket and a next following ticket by bursting said tickets apart along said leading line;

manually accessible outlet means for receiving the separated ticket;

wherein said separation means includes a dull-edged bursting blade movably mounted adjacent a predetermined bursting position along said path, holding means for holding said stream of tickets against substantial deflection from said path at said bursting position and bursting blade drive means for bringing said bursting blade into bursting contact with said stream of tickets at said bursting position to burst said leading ticket from said next following ticket;

wherein said separation means includes feed alignment means for controlling said transport means to bring said leading line of weakness to said bursting position; and wherein said alignment means includes sensor means for detecting a present position of said leading ticket relative to said bursting position, determining means for determining a transport direction and a displacement distance necessary to bring said leading line of weakness to said bursting position, and transport control means for generating a transport control signal indicative of said transport direction and displacement distance, said transport means being responsive to said transport control signal for transporting said stream of tickets in said transport direction by said displacement distance;

9. Apparatus for dispensing tickets, comprising; ticket storage means for storing a plurality of tickets connected in a fan-fold stream headed by a leading ticket, said tickets being separable from each other along lines of weakness; transport means for feeding said stream of tickets from said ticket storage means along a predetermined dispensing path; separation means for separating said leading ticket from said stream of tickets along a leading line of weakness between said leading ticket and a next following ticket; and manually accessible outlet means for receiving the separated ticket, wherein said separation means includes a dull-edged bursting blade movably mounted adjacent a predetermined bursting position along said path, holding means for holding said stream of tickets against substantial deflection from said path at said bursting position and bursting blade drive means for bringing said bursting blade into bursting contact with said stream of tickets at said bursting position to burst said leading ticket from said next following ticket wherein said separation means includes feed alignment means for controlling said transport means to bring said leading line of weakness to said bursting position wherein said alignment means includes sensor means for detecting a present position of said leading ticket relative to said bursting position, determining means for determining a transport direction and a displacement distance necessary to bring said leading line of weakness to said bursting position, and transport control means for generating a transport control signal indicative of said transport direction and displacement distance, said transport means being responsive to said transport control signal for transporting said stream of tickets in said transport direction by said displacement distance wherein said transport control means is responsive to transportation of said stream of tickets by a predetermined incremental distance to generate a transport pulse, said determining means calculates an integral number substantially equal to said displacement distance divided by said incremental distance, and said transport control means permits transports by said transport means during generation of said number of said transport pulses to bring said leading line of weakness of said bursting position.

10. Apparatus according to claim 9, wherein said transport means includes code wheel means for generating said transport pulses.

11. Apparatus according to claim 8, wherein said sensor means detects a leading edge of said leading ticket and said alignment means includes memory means for memorizing a length of said leading ticket.

12. Apparatus according to claim 11, wherein all said tickets have a selected uniform length.

13. Apparatus according to claim 12, further comprising data entry means for entering said uniform length into storage in said memory means.

14. Apparatus according to claim 13, wherein said determining means calculates said number once in response to entry of said uniform length and stores said number in said memory means, said determining means thereafter supplying said stored number to said transport control means for each ticket.

15. Apparatus according to claim 8, wherein said ticket storage means includes a door which may be opened to selectively place tickets in said ticket storage means and remove tickets therefrom and access detector means for detecting and counting each opening of said door.

16. Apparatus according to claim 8, further comprising imprinter means for printing vendor identification data on each, said ticket.

17. Apparatus according to claim 16, wherein said vendor identification data includes a name and address of a vendor associated with said apparatus.

18. Apparatus according to claim 16, wherein said imprinter means is located adjacent said path upstream of the position of said separation means.

19. Apparatus according to claim 18, wherein said imprinter means includes a stamper roller bearing an impression of said vendor identification data and an opposed, closely spaced pressure roller adapted to drivingly receive said stream of tickets therebetween, and an inker roller in rolling contact with said stamper roller, motion of said stream of tickets by said transport means causing said stamper, inker and pressure rollers to rotate so as to bring said impression into inked contact with each said ticket at a predetermined position thereon.

20. A ticket dispensing machine for dispensing tickets directly to the purchaser thereof, said dispenser comprising the combination of housing means for storing a strip of tickets to be dispensed, said housing means having an outlet opening accessible to the purchaser of tickets from said machine, means operable for ordering a plurality of tickets in a single batch, means for separating each of said tickets from said strip, dispensing means for dispensing tickets through said outlet opening, and control means for causing each ticket in said batch to be separated and dispensed separately from the other tickets in said batch regardless of the number of tickets in said batch.

21. A machine as in claim 20 in which said tickets are instant-winner lottery tickets.

22. Apparatus for dispensing tickets from a strip of tickets dilineated from one another by lines along which the material of said strip is weakened, said apparatus comprising, in combination, means for moving said strip towards a dispensing position, a separation member, means for holding said strip adjacent one line along which said strip is to be separated, and causing said strip to bend along said one line at said dispensing position to facilitate tearing of said strip by engagement with said separator member along said one line while said strip is bend, and including drive means for creating motion of said separator member and said strip relative to one another in a direction transverse to the strip, with said member in contact with and deflecting said strip to bend said strip along said one line and burst said tickets apart along said one line.

23. Apparatus as in claim 22 in which said means for holding said strip includes means for releasing said strip under the pull exerted by the deflecting contact of said separator member with said strip to adjust the longitudinal position of said strip in order to align said one line with said member.

24. Apparatus for dispensing tickets from a strip of tickets dilineated from one another by lines along which the material of said strip is weakened, said apparatus comprising, in combination, means for moving said strip towards a dispensing position, means for holding said strip adjacent one line along which said strip is to be separated, and bending said strip along said line to facilitate tearing of said strip along said one line, including separation means having a separator member and drive means for creating motion of said separator member and said strip relative to one another in a direction transverse to the strip, with said member in contact with and deflecting said strip to bend said strip along said one line and burst said tickets apart along said one line, and including means for causing said separator member to break through said strip in one locale and then traverse the strip along said line.

25. Apparatus according to claim 24 in which said drive means includes means for mounting said separator member to traverse said strip, starting from a position in which said separator member is out of contact with said strip.

26. Apparatus according to claim 25 in which said separator member includes a blunt-edged wheel rotatably mounted to roll along said one line.

27. Apparatus according to claim 22 in which said tickets are lottery tickets stored in fan-fold form.

28. A dispenser for dispensing tickets from a strip of tickets printed in a strip with the individual tickets being delineated from one another by lines of weakness, moving means for moving said strip by a pre-determined distance to a position in which one of said lines is near a separation location at which adjacent tickets are separated from one another, said moving means comprising drive means for moving said strip by a pre-determined distance, and position detecting means for detecting the distance actually moved by said strip and producing an output signal to control said drive means to drive said strip until said output signal indicates that said strip actually has moved by said pre-determined distance to dispense one of said tickets, and to control means for severing a ticket from said strip.

29. A dispenser as in claim 28 in which said detecting means includes a rotary code member drivably coupled to said strip, and means for detecting the incremental movements of said wheel and converting them into electrical signals.

30. A dispenser for dispensing tickets from a strip of tickets printed in a strip with the individual tickets being delineated from one another by lines of weakness, moving means for moving said strip by a pre-determined distance to a position in which one of said lines is near a separation location at which adjacent tickets are separated from one another, said moving means comprising drive means for moving said strip by a pre-determined distance, position detecting means for detecting the distance actually moved by said strip and producing an output signal to control said drive means in which said detecting means includes a rotary code member drivably coupled to said strip, means for detecting the incremental movements of said wheel and converting them into electrical signals and including an idler roller driven by the motion of said strip and drivably coupled to a shaft, said code wheel being mounted on said shaft.

31. A dispenser as in claim 28 including a front edge detector to detect the front edge of a ticket to be separated, memory means for storing information corresponding to the distance said strip is to be driven after its front edge is detected and before separation, and means for comparing the stored information with the output of said position detecting means, and for actuating separating means when a pre-determined comparison condition is reached.

32. A dispenser for dispensing tickets from a strip of tickets printed in a strip with the individual tickets being delineated from one another by lines of weakness, moving means for moving said strip by a pre-determined distance to a position in which one of said lines is near a separation location at which adjacent tickets are separated from one another, said moving means comprising drive means for moving said strip by a pre-determined distance, position detecting means for detecting the distance actually moved by said strip and producing an output signal to control said drive means including a front edge detector to detect the front edge of a ticket to be separated, memory means for storing information corresponding to the distance said strip is to be driven after its front edge is detected and before separation, means for comparing the stored information with the output of said position detecting means, and for actuating separating means when a pre-determined comparison condition is reached, including separator means at said separation location, means for causing said dispenser to issue a plurality of tickets, the number of which corresponds to an order for a batch of tickets, and means for operating said separator means to separate each of said tickets from the others in said batch.

33. A dispenser as in claim 28 including separator means for pushing on said strip with a separator member in the vicinity of said one line while gripping said strip on opposite sides of said one line to bend said strip along said line and tear said tickets apart along said one line.

34. A dispenser as in claim 31 including input means for storing corresponding information in said memory means for tickets of a different size from the first-named tickets.

35. A dispenser as in claim 28 in which said tickets are lottery tickets, and including housing means for storing said tickets in fan-fold form, said dispensing apparatus being mounted in said housing.

* * * * *